United States Patent Office 2,996,523
Patented Aug. 15, 1961

2,996,523
METHOD FOR THE PRODUCTION OF 6-METHYL-STEROID DERIVATIVES
Wagn Ole Godtfredsen, Copenhagen, and Sven Liisberg, Trorod, Denmark, assignors to Lovens Kemiske Fabrik Ved A. Kongsted, Ballerup, Denmark, a firm
No Drawing. Filed Aug. 4, 1959, Ser. No. 831,482
Claims priority, application Great Britain Aug. 8, 1958
4 Claims. (Cl. 260—397.3)

The present invention relates to a method of producing $\Delta^4$-3-keto-6$\alpha$-methyl-androstenes and $\Delta^4$-3-keto-6$\alpha$-methyl-pregnenes. When reference is made to androstenes it is intended to designate steroids of the androstene series, and when reference is made to pregnenes it is intended to designate steroids of the pregnene series.

In the compounds hitherto produced by the said method the 6-methyl group has always been a 6$\alpha$-methyl group. It is well known that the introduction of a methyl group in the 6$\alpha$-position enhances the biological activity of steroid compounds, J.A.C.S., 1956, volume 78, page 6213 and 1958, volume 80, page 2904.

In accordance with the method of the present invention, a $\Delta^4$-3-keto-6a,6a-dichloro-6,7-methylene-androstene or -pregnene or a $\Delta^4$-3-keto-6a,6a-dibromo-6,7-methylene-androstene or -pregnene is catalytically hydrogenated in the presence of an acid-binding substance, and then the hydrogenation product thus made is treated with a strong acid, such as hydrochloric acid, nitric acid or sulphuric acid.

The preparation of the $\Delta^4$-3-keto-6a,6a-dihalogeno-6,7-methylene-androstenes or pregnenes is according to the procedure of our copending United States patent application Serial No. 819,203, filed June 10, 1959, for Dihalogen Derivatives of Steroids, which is incorporated herein by reference and made a part hereof.

As hydrogenation catalysts, noble metal catalysts of group VIII of the periodic system are suitable as well as Raney-nickel. Suitable noble metal catalysts include palladium on strontium carbonate, prereduced platinum oxide, palladium on active carbon, and palladium on calcium carbonate. An alkaline earth metal carbonate is very satisfactory as a carrier substance for the noble metal catalyst. A carrier substance of this kind modifies the activity of the palladium catalyst to such as extent that keto groups are not reduced. Other noble metal catalysts, whose activity has been modified in this manner by other carrier substances, such as active carbon or by other means known per se, for example by treatment with a ferrosalt, can also be used.

It will be understood that three molecules of hydrogen are required for the hydrogenation according to the invention. By the said hydrogenation a compound of unknown constitution is formed having an ultraviolet spectrum which shows no specific absorption. This indicates that a 4,5-double bond in conjugation with the 3-keto group is not present. Consequently, the 4,5-double bond present in the final substance has been formed by the treatment of the hydrogenated compound with the strong acid, that is, an acid which in aqueous solution is completely dissociated into hydrogen ions and anions.

The hydrogen halogenide formed during the hydrogenation would, if not neutralized by the acid-binding substance present, to some extent cause formation of the 4,5-double bond during the hydrogenation, and the double bond thus formed would be hydrogenated since it is conjugated with the 3-keto group. Suitable acid-binding substances are alkaline reacting inorganic and organic substances which do not poison the catalyst used and do not react with the steroid used and are soluble in the indifferent solvent in which the hydrogenation is carried out. Thus hydroxides and carbonates of alkali metals such as potassium, sodium or lithium and non-aromatic tertiary amines such as ethylpiperidine, ethylmorpholine, methylpyrrolidine, benzyldimethylamine, trimethylamine, triethylamine, tripropylamine, dimethylethylamine, methyldiethylamine or dimethyldodecylamine may be used as acid-binding substances. The tertiary aliphatic amines, especially the lower amines, are the preferred acid-binding substances.

It is possible to isolate the hydrogenation product from the solution, but in most cases it is preferable to subject the solution to the acid treatment and thereafter isolate the desired compound from the solution.

Example 1

*Production of 6$\alpha$-methyl-testosterone.*—A palladium catalyst was prepared in the following manner. 4 g. of palladium chloride was dissolved in 8 ml. of concentrated hydrochloric acid, and the solution was diluted with 800 ml. of water. Strontium carbonate was added in small amounts while shaking, until the $CO_2$-evolution had stopped. 120 g. of strontium carbonate was then added, and the mixture was shaken mechanically overnight. The solid was filtered off, washed thoroughly with distilled water, then with methanol and ether, and finally dried at 50° C.

6.0 g. of the catalyst thus prepared was suspended in 50 ml. of peroxide-free, anhydrous dioxane and hydrogenated at atmospheric pressure and room temperature. Thereafter a solution of 9.17 g. of 6a,6a-dibromo-6,7-methylene-testosterone and 5.6 ml. of pure triethylamine in 200 ml. of peroxide-free, anhydrous dioxane was added, and the hydrogenation was continued. During 1 hour, 1440 ml. of hydrogen was absorbed, corresponding to 3 mols $H_2$ per mole of the steroid, whereafter the absorption ceased completely. The catalyst was then filtered off and the filtrate evaporated in vacuo at a temperature not exceeding 40° C. The solid, light yellow, fatty residue was recrystallized from 30 ml. of ether and dried. 4.55 g. of the hydrogenation substance was obtained with a M.P. of 150–152° C.

4.5 g. of this substance was dissolved in 100 ml. of ethanol, and to the solution was added 10 ml. of 1 N HCl. The solution was allowed to stand for 18 hours in the course of which it assumed a strong blue color. A saturated solution of $NaHCO_3$ was added until neutral reaction, and the blue color disappeared. The solution was evaporated to a small volume and the concentrated solution extracted with 200 ml. of ether. The ethereal solution was dried with $Na_2SO_4$ and evaporated in vacuo to dryness. The residue was recrystallized from 10 ml. of ethanol and subsequently from 8 ml. of acetone. 3.8 g. of 6$\alpha$-methyl-testosterone was obtained with a M.P. of 157–158° C. The ultraviolet (U.V) spectrum showed a maximum at 242 m$\mu$($\epsilon$=15800).

Example 2

*Production of 6$\alpha$-methyl-testosterone.*—9.17 g. of 6a,6a-dibromo-6,7-methylene-testosterone was hydrogenated as described in Example 1. After hydrogenation the catalyst was filtered off, and to the filtrate was added 2 ml. of 4 N HCl, whereafter the solution was left standing at room temperature for 2 hours. The solution was evaporated in vacuo to a volume of 15 ml. and subsequently diluted with 300 ml. of water. The substance thereby precipitated was filtered off and washed with water, dried and recrystallized from 10 ml. of ethanol. Thereby 4.3 g. of 6$\alpha$-methyl-testosterone was obtained with a M.P. of 157–158° C.

Example 3

*Production of 6α-methyl-testosterone.*—7.38 g. of 6a,6a-dichloro-6,7-methylene-testosterone was dissolved in 100 ml. of dioxane and 5.6 ml. of triethylamine was added. The mixture was hydrogenated at atmospheric pressure and room temperature after adding 6 g. of a prereduced palladium catalyst containing 2% palladium on strontium carbonate. In the course of 45 minutes 3 mols of hydrogen was absorbed (1440 ml.). The catalyst was removed and the filtrate acidified with 10 ml. of 4 N HCl. After standing for 15 minutes at room temperature a solution of sodium carbonate was added in order to adjust the pH to 7.0, and the dioxane was removed by distillation in vacuo. During the evaporation the 6α-methyl-testosterone crystallized. After cooling it was filtered off and recrystallized from 16 ml. of 60% acetone to give 4.7 g. of the desired substance with a M.P. of 156–158° C. U.V. max. at 242 mµ ($\epsilon$=14900).

Example 4

Production of *6α-methyl-testosterone.*—302 mg. of 6a,6a-dibromo-6,7-methylene-testosterone was dissolved in 20 ml. of dioxane and 0.173 ml. of triethylamine was added. The mixture was hydrogenated in the presence of 100 mg. of a prereduced platinum oxide catalyst. In the course of 45 minutes 72 ml. of hydrogen was absorbed and the mixture was worked up as described in the above named examples to give 60% yield of the desired substance.

Example 5

Production of *6α-methyl-testosterone.*—302 mg. of 6a,6a-dibromo-6,7-methylene-testosterone was dissolved in 20 ml. of dioxane and 0.173 ml. of triethylamine was added. The mixture was hydrogenated in the presence of 100 mg. of a palladium catalyst containing 5% palladium on active carbon. During 25 minutes 72 ml. of hydrogen was absorbed. The mixture was worked up as described in Example 3 to give the desired substance.

Example 6

Production of *6α-methyl-testosterone.*—302 mg. of 6a,6a-dibromo-6,7-methylene-testosterone was dissolved in 20 ml. of dioxane and 0.175 ml. of triethylamine was added. In the presence of 200 mg. of Raney-nickel the mixture was hydrogenated at atmospheric pressure and room temperature. During 35 minutes 73 ml. of hydrogen was absorbed and the reaction mixture was worked up as described in Example 3 to give 6α-methyl-testosterone in a yield of 50%.

Example 7

Production of *6α-methyl-19-nor-testosterone-17-acetate.*—9.5 g. of 6a,6a-dibromo-6,7-methylene-19-nor-testosterone-17-acetate was dissolved in 100 ml. of dioxane and 5.6 ml. of triethylamine was added. In the presence of 6 g. of a prereduced palladium catalyst containing 2% palladium on strontinum carbonate the mixture was hydrogenated at atmospheric pressure and room temperature. In the course of 45 minutes 3 mols of hydrogen was absorbed. The catalyst was filtered off and the filtrate worked up as described in Example 1. The raw product was recrystallized from petroleum ether/ether (2:1) to give 4.7 g. of the desired substance with a M.P. of 126–128° C. U.V. max. at 241 mµ ($\epsilon$=15000). $[\alpha]_D^{20}$=+8°.

Example 8

Production of *6α-methyl-progesterone.*—14.53 g. of 6a,6a-dibromo-6,7-methylene-progesterone was dissolved in 200 ml. of methyl Cellosolve (2-methoxy-ethanol), and 8.4 ml. of triethylamine was added. In the presence of 20 g. of a prereduced palladium catalyst containing 2% palladium on strontium carbonate the mixture was hydrogenated at atmospheric pressure and room temperature. During 1½ hours 3 mols of hydrogen was absorbed and the consumption of hydrogen ceased. The catalyst was removed and the filtrate acidified by addition of 1 N HCl. After standing for 1 hour at room temperature water was added. After scratching on the wall the product crystallized, whereafter it was collected on a filter, washed with dilute methanol and dried. By recrystallization from hexane, 7.1 g. of the pure 6α-methyl-progesterone with a M.P. of 122–123.5° C. was obtained. U.V. max. at 242 mµ ($\epsilon$=16200). $[\alpha]_D^{20}$=+177°.

Example 9

Production of *6α-17α-dimethyl-testosterone.*—8.5 g. of 6a,6a-dibromo-6,7-methylene-17α-methyltestosterone was dissolved in 175 ml. of dioxane and 5 ml. of triethylamine was added. The solution was mixed with 5 g. of a prereduced palladium catalyst containing 2% palladium on strontium carbonate. The mixture was shaken with hydrogen at atmospheric pressure and room temperature. During 30 minutes 1285 ml. of hydrogen was absorbed. The catalyst was filtered off and the filtrate acidified with 5 ml. of 2 N HCl. The solution was left standing at room temperature for 15 minutes, neutralized with aqueous NaHCO₃ and evaporated in vacuo to a small volume. The residue was extracted with ether and the ethereal solution was dried and evaporated in vacuo.

The residue was recrystallized from a mixture of 90% ether and 10% petroleum ether (boiling range 40–60° C.). Thereby, 4.2 g. of the desired substance was obtained with a M.P. of 136–137° C. U.V. max. at 241 mµ ($\epsilon$=15000). $[\alpha]_D^{20}$=+66° (1% in CHCl₃).

Example 10

*Production of 6α-methyl-17α-acetoxy-progesterone.*— 2.0 g. of a palladium catalyst prepared in the manner described in Example 1 was suspended in 15 ml. of anhydrous dioxane and hydrogenated at atmospheric pressure. Thereafter a solution of 2.47 g. of 6a,6a-dibromo-6,7-methylene-17α-acetoxy-progesterone in a mixture of 20 ml. of anhydrous dioxane and 1.3 ml. of triethylamine was added, and the hydrogenation was continued by shaking the mixture with hydrogen at atmospheric pressure. When 3 mols of hydrogen per mole of the steroid compound had been absorbed, the catalyst was filtered off and the filtrate acidified with 1 ml. of 4 N HCl. After standing for 1 hour the hydrogenation product was precipitated by addition of water, and the precipitate was filtered off and washed with water. Thereby, 1.30 g. of the desired substance was obtained with a M.P. of 190–195° C. By recrystallization from isopropanol the M.P. was raised to 205–207° C. U.V. max. at 241 mµ ($\epsilon$=15550) in ethanol. $[\alpha]_D^{22}$=+60.8° (1% in CHCl₃).

Applying the procedure described above, but substituting the caproate, the phenylacetate, the propionate or the β-cyclo-pentyl-propionate of 6a,6a-dibromo-6,7-methylene-17α-hydroxy-progesterone for 6a,6a-dibromo-6,7-methylene-17α-acetoxy-progesterone, the corresponding ester of 6α-methyl-17α-hydroxy-progesterone is obtained with a M.P. of 105–107° C. and $[\alpha]_D^{20}$=+46° for the caproate, M.P. 164–166° C. and $[\alpha]_D^{20}$=+62° for the phenylacetate, M.P. 155–157° C. and $[\alpha]_D^{20}$=+45° for the propionate and finally M.P. 135–137° C. and $[\alpha]_D^{20}$=+44° for the β-cyclopentylpropionate.

Example 11

*Production of 6α-methyl-17α-hydroxy-11-desoxy-corticosterone-21-acetate.*—8 g. of a catalyst prepared as described in Example 1 was suspended in 60 ml. of methyl Cellosolve and hydrogenated at atmospheric pressure and room temperature. Thereafter, a solution of 9.0 g. of 6a,6a-dibromo-6,7-methylene-17α-hydroxy-11-desoxycorticosterone-21-acetate and 4.5 ml. of triethylamine in 75 ml. of methyl Cellosolve was added, and the hydrogenation was continued. During 1 hour 1160 ml. of hydrogen (3.0 mols per mole steroid) was absorbed, whereafter the absorption ceased. The catalyst was filtered off, 1.5 ml. of 4 N HCl was added and the solution was left standing at room temperature for 30 minutes. The desired substance was precipitated by addition of water and dried. 5.3 g. of the substance was obtained with a M.P. of 193–194° C. After recrystallization from acetone/hexane the M.P. was 198.5–200° C. Calculated: C 71.57; H 8.87. Found: C 71.23; H 8.64.

*Example 12*

Production of 6α-methyl-cortisone-acetate.—5.0 g. of a catalyst prepared as described in Example 1 was suspended in 40 ml. of methyl Cellosolve and hydrogenated at atmospheric pressure and room temperature. Thereafter a solution of 5.72 g. of 6a,6a-dibromo-6,7-methylene-cortisone-acetate and 2.8 ml. of triethylamine in 50 ml. of methyl Cellosolve was added, and hydrogenation was continued. During 1 hour 740 ml. of hydrogen (3.08 mols per mole steroid) was absorbed. Towards the end of this period the rate of absorption had decreased to about 2% of the initial rate. The catalyst was filtered off and 1 ml. of 4 N HCl was added, whereafter the solution was left standing for 30 minutes under nitrogen at room temperature. By addition of water the desired compound was precipitated from the solution. 3.58 g. of the dry substance was obtained. After recrystallization from abs. ethanol the product had a M.P. of 232–237° C., and after further recrystallization from abs. ethanol, 237–238° C. U.V. max. at 238 m$\mu$ ($\epsilon$=15000). Calculated: C 69.21; H 7.74. Found: C 68.99; H 7.90.

*Example 13*

Production of 6α-methyl-cortisone-acetate.—17.2 g. of 6a,6a-dibromo-6,7-methylene-cortisone acetate was dissolved in a mixture of 300 ml. of 2-ethoxy ethanol and 9 ml. of triethylamine and hydrogenated at room temperature and atmospheric pressure in the presence of 10 g. of the commercially available palladium catalyst containing 5% palladium on calcium carbonate. When 3 mols of hydrogen per mole of the steroid compound had been absorbed, the catalyst was filtered off and the filtrate acidified with 5 ml. of 4 N HCl. After standing for 30 minutes under nitrogen at room temperature the reaction product was precipitated by addition of water. Thereby 10.5 g. of the desired substance was obtained with a M.P. of 234–235.5° C. By one recrystallization from abs. ethanol the substantially pure substance was obtained with a M.P. of 237–239° C. and $[\alpha]_D^{22}=+204°$ (1% in $CHCl_3$).

Having thus described our invention what we claim as new and desire to secure by Letters Patent is:

1. A method of producing $\Delta^4$-3-keto-6α-methyl-androstenes and -pregnenes, which comprises hydrogenating with gaseous hydrogen a compound of the class consisting of $\Delta^4$-3-keto-6a,6a-dichloro-6,7-methylene androstenes,
$\Delta^4$-3-keto-6a,6a-dibromo-6,7-methylene androstenes,
$\Delta^4$-3-keto-6a,6a-dichloro-6,7-methylene pregnenes, and
$\Delta^4$-3-keto-6a,6a-dibromo-6,7-methylene pregnenes, in the presence of a hydrogenation catalyst of the class consisting of noble metal catalyst of group VIII of the periodic system and Raney-nickel, and in the presence of an alkaline reacting substance, and subsequently treating the product thus formed with an acid which in aqueous solution is completely dissociated into hydrogen ions and anions.

2. A method of claim 1, which comprises hydrogenating in the presence of a noble metal catalyst of group VIII of the periodic system.

3. A method of claim 1, which comprises hydrogenating in the presence of a Raney-nickel catalyst.

4. A method of claim 1, which comprises hydrogenating in the presence of a tertiary aliphatic amine.

No references cited.